(12) United States Patent
Xavier et al.

(10) Patent No.: US 8,592,343 B2
(45) Date of Patent: Nov. 26, 2013

(54) POLYMERIC COMPOSITIONS CONTAINING RHIZOBIUM AND/OR PLANT GROWTH-PROMOTING RHIZOBACTERIA INOCULANT, USE THEREOF AND SEEDS TREATED WITH THE COMPOSITIONS

(75) Inventors: Gustavo Ribeiro Xavier, Seropédica (BR); Normagouvea Rumjanek, Seropédica (BR); Paulo Ivan Fernandes, Jr., Rio de Janeiro (BR); Paulo Jansen De Oliveira, Seropédica (BR); Tiago Gusmao Rohr, Vila Velha (ES)

(73) Assignee: Embrapa and Universidade Federal Rural do Rio de Janeiro, Seropedica RJ (BR)

( * ) Notice: Subject to any disclaimer, the term of this patent is extended or adjusted under 35 U.S.C. 154(b) by 1761 days.

(21) Appl. No.: 11/517,326

(22) Filed: Sep. 8, 2006

(65) Prior Publication Data

US 2007/0068072 A1     Mar. 29, 2007

Related U.S. Application Data

(60) Provisional application No. 60/715,157, filed on Sep. 9, 2005.

(51) Int. Cl.
*A01N 25/26*     (2006.01)
*A01N 63/00*     (2006.01)

(52) U.S. Cl.
USPC .......................................... 504/100; 504/117

(58) Field of Classification Search
None
See application file for complete search history.

(56) References Cited

U.S. PATENT DOCUMENTS

| | | | |
|---|---|---|---|
| 6,387,145 B1 * | 5/2002 | Miele et al. | 71/6 |
| 6,410,618 B2 * | 6/2002 | Uryu et al. | 524/27 |
| 2004/0175407 A1 * | 9/2004 | McDaniel | 424/423 |
| 2006/0029576 A1 * | 2/2006 | Huang et al. | 424/93.4 |
| 2006/0127453 A1 * | 6/2006 | Harel | 424/442 |

FOREIGN PATENT DOCUMENTS

WO     WO 2004043140 A2 *   5/2004

* cited by examiner

*Primary Examiner* — Alton Pryor
(74) *Attorney, Agent, or Firm* — Arent Fox LLP

(57) ABSTRACT

Biological nitrogen fixation is a very important process to plant growth and health. Biological nitrogen fixation is performed naturally by a number of different microorganisms including plant growth-promoting rhizobacteria, mycorrhizal fungi, and *rhizobia*. The present invention discloses novel compositions comprising water soluble polymers, *rhizobium* and plant-growth promoting rhizobacteria. Uses of the novel composition include treatment of seeds prior to planting and use in soil surrounding roots to improve plant growth and health.

18 Claims, 1 Drawing Sheet

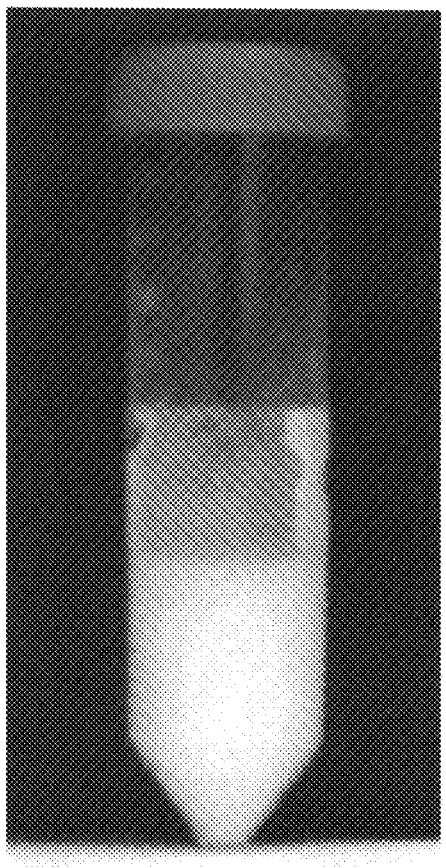

POLYMERIC COMPOSITIONS CONTAINING RHIZOBIUM AND/OR PLANT GROWTH-PROMOTING RHIZOBACTERIA INOCULANT, USE THEREOF AND SEEDS TREATED WITH THE COMPOSITIONS

This application is a U.S. non-provisional application of provisional application 60/715,157, filed Sep. 9, 2005, which is incorporated by reference in its entirety.

DESCRIPTION OF THE INVENTION

1. Field of the Invention

The present invention refers to inoculant compositions with agricultural purposes based on polymeric mixtures, more particularly cellulose esters and starch, compatible with *rhizobia* and/or Plant Growth-Promoting Rhizobacteria (PGPR), so as to obtain a product offering good quality in terms of lower contamination rates and higher quantities of viable cells, as required by the technical norms for the production of inoculants.

2. Background of the Invention

Biological Nitrogen Fixation (BNF) is a very important process to plant growth and health. BNF is performed naturally by a number of different microorganisms which may be classified in two main groups: (i) saprophytes and (ii) mutualistic symbionts. Saprophytes include the so-called Plant Growth-Promoting Rhizobacteria (PGPR) and the mutualistic symbionts include mycorrhizal fungi and *rhizobia*.

Both *rhizobia* and rhizobacteria have a close relationship with plant roots. *Rhizobium* has a symbiotic interaction with legume roots, and rhizobacteria inhabit the root surface or the rhizosphere soil. To achieve an efficient BNF, the *Rhizobium* and/or rhizobacteria inoculation must be successful, i.e. a large population of an appropriate bacterial strain must be available close to the emerging root. In such a case the majority of nodules are formed by the inoculated *rhizobia*, and the inoculated rhizobacterial strain occupies the rhizosphere as major member of rhizobacteria which are present. If the resulting population is not large enough, the majority of nodules are formed by the native *rhizobia*, and native rhizobacteria will occupy the rhizosphere as the major member of rhizobacteria which are present, leading to unsatisfactory effect of inoculation.

In terms of BNF, the application of *rhizobia* or rhizobacteria or even both *rhizobia* and rhizobacteria depends on several parameters, including kind of plant to be grown and developed, soil properties etc., and even importantly *rhizobia* and rhizobacteria must not be antagonistic. Tilak et al. (Tilak, K. V. B. R.; Ranganayaki, N.; and Manoharachari, C. "Synergistic effects of plant-growth promoting rhizobacteria and *Rhizobium* on nodulation and nitrogen fixation by pigeonpea (*Cajanus cajan*)". European Journal of Soil Science. February 2006, 57, 67-71) showed that plant-growth promoting rhizobacteria, in conjunction with efficient *Rhizobium*, can positively affect the growth and nitrogen fixation of pigeonpea by inducing the occupancy of introduced *Rhizobium* in the nodules of the legume.

The benefits of Biological Nitrogen Fixation (BNF) may be extended to a large number of legumes that are not grown on large farmlands, which is the case of soy beans in Brazil. Caupi grown in areas of the north-eastern back country is a good example of a culture that may receive more nitrogen due to BNF resulting from inoculation. Small scale organic producers can also benefit from this technology by improving the BNF in the manure that is a vital part of this production system. Other legumes, used as forage for the recovery of depleted areas or in mixed pastures, may also be better exploited. However, the difficulties related to the use of peat as a carrier for *rhizobium* inoculants, arising from the costs of sterilisation and the quality of the material, led to a search for new carriers that can be used with solid inoculants.

The use of solid rather than liquid inoculant is viable on the large farmlands where sowing is entirely mechanised. Furthermore, the distribution of liquid inoculant must occur in controlled conditions, which may render delivery of small batches of the product impossible. In this sense, the development of new formulas of solid inoculant, which are even more stable in terms of maintaining the viable *rhizobium* population than the peat based inoculants and that can be more easily sterilised, has become a demand in this field so as to provide a product enabling broader distribution and area of action and, thus, fulfil the requirements of small and medium producers that plant different legumes.

Research aimed at obtaining an alternative material for peat as an inoculant became more intense in the early eighties of the last century, but, since then, little work was done with peat for this purpose. Therefore, there is a lack of research information concerning the use of new substrates that may be employed as a carrier for inoculants.

The use of inoculants is an agricultural practice for placing *rhizobium* cells and seeds in contact with each other with the intent of increasing the density of the cells, as in the case of the symbiotic association with leguminous species. However, even after inoculation with an efficient pre-selected stock, the level of nitrogen resulting from BNF may remain reduced. This occurs because the inoculant is incapable of competing with the stock present in the soil (BOTTOMLEY, P. J. Ecology of *Bradyrhizobium* and *Rhizobium*. In: Biological Nitrogen Fixation (G. Stacey, R. H. Burris & H. J. Evans, Editors), p. 293-348. Chapman & Hall, New York, 1992).

Enhancing the contribution of BNF in leguminous plants is a line of research receiving great attention both in countries with temperate or tropical climates. The development of a strategy that provides these gains should fulfil two main requirements: (1) the selection of an efficient plant/*rhizobium* association and, (2) the development of an inoculant compatible with the desired conditions of use (as revised by BROCKWELL, J.; BOTTOMLEY, P. J. Recent advances in inoculant technology and prospects for the future. Soil Biology and Biochemistry, v. 27, p. 683-697, 1995 and HERRIDGE, D.; GEMELL, G.; HARTLEY, E. Legume inoculants and quality control. Inoculants and Nitrogen Fixation of Legumes in Vietnam. 2002. p. 105-115.). The first strategy depends on ascertaining the native *rhizobia* as well as those in the production area of the culture of interest. The second strategy depends on compatibility studies of the properties of the substrates and the microbial agents in order to ensure that the product will have the stability and shelf life required by the regulations in force.

Historically, the commercial production of inoculants for legumes began in 1895 in Britain and the USA. It began in Brazil in the 1950's (FREIRE, J. R. J. Trabalhos em Rizobiologia no RGS. [Work with rhizobiology in RGS.] In: Reunião Latino-Americana. Inoculantes Leguminosa, 4, Porto Alegre, Anais, [publisher unknown], 1968. p. 19-24). Inoculant technology benefited from the contributions of Vincent (VINCENT, J. M. A Manual for the Practical Study of Root-Nodule Bacteria. IBP Handbook n. 15. Blackwell, Oxford, 1970), Burton (BURTON, J. C. Methods of inoculating seeds and their effect on survival of *rhizobia* In: Symbiotic Nitrogen Fixation in Plants (P. S. Nutman), International Biological Programme Publication, n. 7, p. 175-189.1976; BURTON, J. C. Modern concepts in legume inoculation. In Biological Nitrogen Fixation Technology for Tropical Agriculture (P. H. Graham and S. C. Harris, Eds.) CIAT, Cali. p. 105-114, 1982), Date & Roughley (DATE, R. A.; ROUGHLEY, R. J. Preparation of legume seed inoculants. In: A Treatise on Dinitrogen Fixation Section IV. Agronomy and Ecology (R. W. Hardy and A. H. Gibson, Editors), Wiley, New York. p. 243-275, 1977), Brockwell (BROCKWELL, J. Application of legume seed inoculants. In: A Treatise on Dinitrogen Fixation Section IV. Agronomy and Ecology (R. W. Hardy & A. H. Gibson, Eds.), Wiley, New York. p. 277-309, 1977) and Thompson (THOMPSON, J. A. Production and quality control of legume inoculants. In: Methods for Evaluating Biological Nitrogen Fixation (F. J. Bergersen, Ed.), p. 489-533, Wiley, Chichester, 1980; THOMPSON, J. A. Production and quality control of carrier-based legume inoculants. Information Bulletin. n. 17. ICRISAT, Patancheru, A. P. 1983). These all contributed with principles, preparation practices and uses for inoculants. These authors expressed divergent opinions concerning the preparation of inoculants. Burton's method (1976) considered the use of non-sterilised peat as adequate, while the other authors at the time were beginning to adopt the practice of sterilisation as a manner of ensuring better quality for the inoculants (Date & Roughley, 1977 and Thompson (1980). Date and Roughley (1977) furthermore, introduced the issue of cell numbers considering that the inoculants produced from sterile peat could contain 100 times less *rhizobium* cells than those produced from non-sterilised peat due to the increased mortality rate of the *rhizobia* resulting from the non-asepsis of the material and the storage time. Apart from selecting an efficient *rhizobium* stock for specific planting conditions, the success of the inoculation also depended on aspects directly related to the manufacture of the inoculants, such as, for example, the capability of maintaining a high number of viable cells up until the moment of use by the farmer (MEADE, J.; HIGGINS, P.; O'GARA, F. Production and storage of *Rhizobium leguminosarum* cell concentrates for use as inoculants. Journal of Applied Bacteriology, London, v. 58, n. 5, p. 571-524. 1985).

The first inoculants used agar and sterilized soil as carriers. However, after a few years, inoculant producers began using peat as a vehicle and this was soon widely adopted in various countries (Vincent, 1970). Nevertheless, the peat produced from organic alluvial and acid soils—a more or less dark, spongy material consisting of vegetable matter in varying degrees of decomposition—is not readily encountered and even when it is available, the quality may be inadequate for the production of inoculants. High quality peat ideal for the production of inoculants is posesses a high amount of organic matter which ensures the viability of the *rhizobium* populations. In Brazil, peat was the carrier material most used for inoculants up until the 1990's. It had to be sieved and the pH required correcting with lime to obtain neutral values (6.8 to 7.0). During this period, sterilisation of the peat was not a common practice, which resulted in a verifiable reduction in the quality of the product and consequently reduced the probability of successful inoculation (SIQUEIRA, J. O.; FRANCO, A. A. Biotecnologia do Solo: Fundamentos e Perspectivas. [Soil Biotechnology: Fundaments and Perspectives] FAEPE/ABEAS/MEC/ESAL. Lavras, 1988. 236 p.). Later, following Mercosul (South Cone Market) negotiations, control of inoculants became stricter and required prior sterilisation of the peat by gamma radiation (5 mrads) or in autoclave due to the high degree of contamination by microorganisms naturally present in organic matter. However, the sterilisation of peat increases production costs and does not necessarily result in a product entirely free of microorganisms. Yardin and collaborators (YARDIN, M. R.; KENNEDY, I. R.; THIES, J. E. Development of high quality carrier materials for field delivery of key microorganisms used as biofertilizers and bio-pesticides. Radiation Physics and Chemistry, 57, 565-568, 2000) verified that even sterilisation at 50 mrads did not eliminate Gram-positive spore forming bacteria such as *Bacillus* and actinomycete.

A peat based inculant, after being mixed with water, is easily applied by gentle mixing with the seeds until uniform pelleting is achieved on the seed surface. This mixing may be manual or mechanical. Certain products were developed so as to ensure greater adhesion to the seeds regardless of the presence of water or other chemical adherents. Such dry application eliminates any pre-germination of the seeds (NITRAL URBANA. 2004. Seen at: www.nitralurbana.com.br, consulted on Feb. 26, 2004).

In Brazil, the increase in production costs, due mainly to the sterilisation of the peat, has rendered liquid inoculants increasingly popular. The preparation of this type of inoculant is relatively simple, especially in relation to sterilisation of the vehicle. Liquid inoculant is ideal for large mechanised crops, such as soy beans, since it can be added to the seeds during sowing which affords good adhesion to the seed surface despite the agitation and friction occurring during the sowing process (Nitral Urbana, 2004). This type of carrier is mainly being used for the culture of soy beans, where the application occurs mechanically at the moment of sowing. However, the viability of bacteria of the *rhizobia* group in water is dependant on the presence of stabilisers which result from the research undertaken by the manufacturer of the inoculant. As well as the necessary presence of stabilisers, the product cannot be exposed to excessive temperatures during transport, which is a condition difficult to avoid in a tropical country. Care in packing, such as the use of expanded polystyrene boxes, help ensure that the product reaches the farmer in perfect condition.

Peat and related materials of biological origin have been employed as carrier in inoculants for use with legumes for over 100 years. Despite the inherent difficulties using this material and that research for alternative carriers has been particularly encouraged in regions without natural peat deposits, there has been little overall progress in the search for alternative carriers that meet the demands of present agricultural production. From the industrial point of view, an inoculant is expected to be easily applied and must withstand a wide range of conditions (DATE, R. A. Advances in inoculant technology: a brief review. Australian Journal of Experimental Agriculture, v. 41, p. 321-325, 2001). There has been increasing concern for the quality of inoculants worldwide with reducing tolerances for the presence of contaminants and demands for minimum *rhizobia* requirements (OLSEN, P. E.; RICE, W. A.; BORDELEAU, L. M.; BIERDERBECK, V. O. Analysis and regulation of legume inoculants in Canada: the need for an increase in standards. Plant and Soil, v. 161, n. 1, p. 127-134. 1994).

The list of carriers that have already been tested as alternatives to peat is quite extensive and include clays, coal, urban compost, diatomite, lignite, cellulose powder, ground coconut, dried grape dregs, talcum, peat and vermiculite (Date & Roughley, 1977; FIGUEIREDO, M. V. B.; STAMFORD, N. P.; VIDOR, C.; VILAR, J. J.; OLIVEIRA FILHO, E. C. Sobrevivência do *Bradyrhizobium* sp. em substratos alternativos. [Survival of *Bradyrhizobium* sp. in alternative substrates] Pesquisa Agropecuária Brasileira, Brasilia, 27(11): 1497-1506, 1992). Figueiredo and collaborators (1992) showed that diatomite is comparable to peat when used as carrier for inoculants. Rebah and collaborators (RE- BAH, F. B.; TYAGI, R. D.; PREVOST, D. Production of *S. meliloti* using wastewater sludge as a raw material: effect of nutrient addition and pH control. Environmental Technology, v. 23, p. 623-6292, 2002), in an attempt to improve alternative inoculants, proposed the use of urban wastewater sludge with the addition of glycerol and yeast extract, with the aim of recycling materials. However, despite results demonstrating an increase in the number of cells, the performance of this inoculant was inferior to a traditional inoculant used as control. Piadang and collaborators (PIADANG, S.; THANANUSONT, V.; PIADANG, S.; THANANUSONT, V.; OATES, C. G. The effectiveness of *Rhizobium* using irradiated sludge from wastewater treatment plants and filter press cake from sugar mills as carriers: II. Field trial of carriers. The 37th Kasetsart University Annual Conference, 3-5 February, p. 133-140, 1990) compared the performance of liquid inoculants with inoculants based on peat, irradiated urban wastewater sludge and filter press cake and noted that the inoculant based on sludge and filter cake (1:3) showed better rates of nitrogen fixation, number and weight of nodules than the control treatment but, however, lower rates when compared to peat based and liquid inoculants.

An inoculant prepared from freeze dried cells followed by re-suspension in oil also showed promising results (KREMER, R. J.; PETERSON, H. L. Effect of inoculant carrier on survival of *Rhizobium* on inoculated seed. Soil Science, v. 134, p. 117-125.1982; KREMER, R. J.; PETERSON, H. L. Field evaluation of selected *Rhizobium* in an improved legume inoculant. Agronomy Journal, v. 75, p. 139-143, 1983a). According to Hoben and collaborators (HOBEN, H. J.; AUNG, N. N.; SOMASEGARAN, P; KANG, U. G. Oils as adhesives for seed inoculation and their influence on the survival of *Rhizobium* spp. and *Bradyrhizobium* spp. on inoculated seeds. World Journal of Microbiology and Biotechnology, v. 7, p. 324-330, 1991), this carrier is being singled out as a promising adhesive for the inoculation of seeds. Araújo (ARAUJO, A. C. B. de. Inoculante oleoso e sobrevivência de rizóbio submetido áseca e a alta temperatura após a semeadura do feijoeiro. [Oleaginous inoculant and survival of *rhizobia* submitted to drought and high temperatures after sowing] 1993. Dissertação de Mestrado, 110 p (Mestrado em Agronomia, área de concentração Ciência do Solo)-Universidade Federal Rural do Rio de Janeiro, Seropédica, RJ) employed freeze-dried cells suspended in oil as an inoculant, which ensured better survival of the *rhizobia* when compared to a peat based inoculant even under stressful temperature and humidity conditions.

Certain attempts using polymers have also been under study. Dommergues and collaborators (DOMMERGUES, Y. R.; DIEM, H. G.; DIVIES, C. Polyacrylamide-entrapped *Rhizobium* as an inoculant for legumes. Applied and Environmental Microbiology, v. 37, p. 779-781, 1979), using *B. japonicum* in a polyacrylamide gel, observed that both survival and nodulation were similar to the treatment using peat based inoculant. The concept has been extended for use with new polymers, however, the use of these has shown that the survival of the bacteria is also dependant on the humidity of the gel employed (JUNG, G.; MUGNIER, J. Polymer-entrapped *Rhizobium* as an inoculant for legumes. Plant and Soil, 65, 219-231, 1982). These authors tested the use of alginates and xanthan gum, both dry and semi-dry, as alternative carriers for inoculants and showed that the inoculation of plants with products based on xanthan gum resulted in productivity similar to peat based inoculants provided shelf life did not exceed 90 days. Jawson and collaborators (JAWSON, M. D.; FRANZLUEBBERS, A. J.; BERG, R. K. *Bradyrhizobium japonicum* survival in and soybean inoculation with fluid gels. Applied Environmental Microbiology, v. 55, p. 617-622.1989) used various gels based on cellulose and reported excellent bacteria survival levels and nodulation including in field conditions despite natural competitively with other stock.

Document U.S. Pat. No. 4,434,231 describes a process for entrapping microorganisms within a polymeric matrix composed of a polymer gel based on at least one polymer selected from the polysaccharide group, in which the said polymer is at least partially reticulated. The resulting products may be used in the inoculation of leguminous and non-leguminous plants so as to increase the nitrogen fixing potential and nutrition of the plant. The polymer is selected from natural or bio-synthetic gums, such as alginates, carrageen, agar, caraya gum, tragacanth gum, arabic gum, carob gum and guar gum. The reticulation of the polymer may be achieved by thermal treatment, treatment with a metal salt or by synergism with another polymer, preferentially another polysaccharide. The problem with this type of polymeric matrix is associated to the fact that it is partially reticulated, which hinders its biodegradability.

Other inoculants entrapped in water soluble polymers have been proposed (see summary of patent document JP 6141848). The greatest problem with this type of matrix is the high presence of water which drastically reduces the quantity of viable *rhizobia* cells mainly due to contamination problems resulting from mould and the germination of fungal competitors of *rhizobia*. Furthermore, the excess of water is considered a negative factor since it makes seed pelleting more difficult.

The process described in document U.S. Pat. No. 4,755,468 advances a solution to the problem of excess water presence in the polymeric matrix, as in the case of the inoculant described in document U.S. Pat. No. 4,434,231, by means of a drying stage for the mixture of microorganisms of the genus *Rhizobium* and at least one source of carbohydrates in a polymer gel. This drying stage is intended to reduce the activity of the water in the resulting inoculum to values inferior to 0.1. The difficulty of this process lies in maintaining a low water content in the polymer gel because it is a material having great tendency to absorb water from the environment. Also, apart from the fact that the drying stage renders the final product more expensive, the survival rate of the *rhizobia* may fall due to the reduction in the quantity of water.

Document JP 8143410 further proposes the inclusion of the microorganism cells in a support, taking the form of a grid or film made of a natural polymer, such as cotton, flax, paper, cork or a synthetic polymer such as vinylidene poly(chloride), polyacrylates, vinyl poly(chloride), polyamide or polyester, with the said support being fixed to the plant body in order for symbiosis to occur. However, this material is not suitable for relative long periods of storage.

Document JP 1030585 also proposes an inoculant in the form of microcapsules of sodium alginate or carrageen gum enclosing the microorganism and a nutrient solution for the latter. The entrapment may be by the method of precipitation in an ethylcellulose polymer interface (used as a temporary support for the formation of the microcapsules) and consolidated by curing using the method of polymerisation by interface with a material such as nylon-6 or nylon-10. This is a complex method and involves stages that may lead to a reduction in the quantity of viable cells.

Yet another solution for preparing a *rhizobia* inoculant is proposed in document US 2002/050096. This method is based on the use of a compound of molybdenium to neutralise the toxic exudates of the seed in an aqueous base. The inoculant composition is in the form of a suspension of the *rhizobia* cells in an aqueous base containing: the molybdenum compound; a polymer selected from vinylpyrrolidone polymers, vinyl acetate copolymers and styrene copolymers; and adjuvants such as carboxymethylcellolose, gum arabic, sodium alginate and similar. However, liquid compositions present various inconveniences, as pointed out above.

Therefore, results demonstrate that various carriers may be used as substitutes for peat, and some, furthermore, to an advantage in terms of better cell survival rates and ease of processing relating to sterilisation conditions. In this context, the adoption of new technology may revert the paradoxical situation noted by Brockwell & Bottomley (1995) when comparing the potential for BNF through the practice of inoculation with the stagnation and even decline in world production of inoculants. The greatest challenge is to encounter materials that on one hand permit the retention of sufficient water to enable the survival of the microorganisms and on the other hand restrain water activity rates capable of promoting the growth of competitor organisms of *rhizobia*.

SUMMARY OF THE INVENTION

In accordance with the invention, overall, the objective of the present invention is to provide *rhizobium* and/or plant growth-promoting rhizobacteria inoculants prepared from polymeric mixtures based on derivates of cellulose and a source of carbon easily used by the bacterial cells not only during storage but also when released into the environment.

A first embodiment provides polymeric compositions containing *rhizobium* and/or plant growth-promoting rhizobacteria inoculant including: (a) an aqueous suspension containing cells of microorganisms of the genus *Rhizobium* and/or at least one rhizobacterium selected from plant growth-promoting rhizobacteria; (b) a carrier, in gel form, for the *rhizobium* inoculant and/or for the inoculant of said at least one rhizobacterium selected from plant growth-promoting rhizobacteria including: (i) a water soluble polymer derived from cellulose selected from a group consisting of carboxymethylcellulose, esters of carboxymethylcellulose, carboxymethylcellulose alkaline metal salts, hydroxypropyl cellulose, hydroxypropylmethyl cellulose, hydroxyethyl cellulose and mixtures thereof; (ii) a source of carbon, preferentially one or more amino acids, ora carbohydrate, selected from the group consisting of starch; modified starch; mannitol; glucose; dextrine; polydextrine; malt-dextrine or mixtures thereof; (iii) optionally, a compatibility agent for the mixture; (iv) optionally, nutrient additives or growth factors selected from the group consisting of sugars, amino-acids, proteins, salts and similar, or mixtures of these; (v) optionally, adjuvants selected from osmotic-regulator agents, buffer agents or pH correctors; (c) water in sufficient quantity to form the polymer gel and maintain the cells of microorganisms of the genus *Rhizobium* and/or said at least one rhizobacterium selected from plant growth-promoting rhizobacteria viable; and with the proviso that when said *rhizobia* and said at least one rhizobacterium selected from plant growth-promoting rhizobacteria are present they are not antagonist to each other.

A second embodiment of the present invention provides the use of the polymeric composition of the invention in propagating *Rhizobium* and/or at least one rhizobacterium selected from plant growth-promoting rhizobacteria by applying said polymeric composition to root surface or rhizosphere soil for improving fixed nitrogen availability to the plant, increasing root surface, increasing the production of vegetative growth hormones, controlling phytopathogens and other factors which have a substantial influence on plant growth and development.

A third embodiment of the present invention provides the use of the polymeric composition containing the *rhizobium* and/or at least one rhizobacterium selected from plant growth-promoting rhizobacteria inoculants of the invention in the treatment of seeds intended for planting, including vegetable seeds.

A fourth embodiment of the present invention provides the use of the polymeric composition containing the *rhizobium* and/or at least one rhizobacterium selected from plant growth-promoting rhizobacteria inoculants of the invention in the soil in areas surrounding the roots for obtaining a synergistic effect which improves the symbiosis of *rhizobia* cells—roots with the proviso that said *rhizobia* and said at least one rhizobacterium selected from plant growth-promoting rhizobacteria are not antagonist to each other.

A fifth embodiment of the present invention provides seeds of leguminous or nonleguminous plants treated with the polymeric composition containing the *rhizobium* and/or at least one rhizobacterium selected from plant growth-promoting rhizobacteria inoculants of the invention.

BRIEF DESCRIPTION OF THE DRAWINGS

FIG. 1 is FIG. 1 shows the inoculant based on a mixture of compatible CMC/starch six months after preparation.

DESCRIPTION OF THE EMBODIMENTS

The inoculation of leguminous pulse bearing plants with *rhizobia* has achieved impressive costs savings in agricultural production through a reduced use of nitrogenised mineral fertilisers resulting from the advantages of the BNF process. The adoption of this technology depends initially on verifying the compatibility of the bacteria and the inoculation carrier while taking into account the survival of the bacteria (shelf life) in the substrate.

Furthermore, the efficiency of the inoculation depends on the capability of the polymer/bacteria mixture of adhering to the seeds in order to afford contact between the bacteria and seed and thus trigger the colonisation process of the roots by the nodular bacteria that fix atmospheric nitrogen.

The present invention has the objective of providing such compatibility by the use of *rhizobium* and/or at least one rhizobacterium selected from plant growth-promoting rhizobacteria inoculants prepared from polymeric mixtures based on derivates of cellulose—preferentially ester cellulose—and starch in a manner so as to obtain a good quality product with reduced contamination rates and increased viable cell quantities.

According to the invention, said at least one rhizobacterium is selected from the group of plant growth-promoting rhizobacteria including *Pseudomonas* spp, *Herbaspirillum* spp., *Azospirillum* spp., and *Bacillus* spp., e.g. *Bacillus cereus*. It must be emphasized that the at least one rhizobacterium to be used in the composition of the present invention should not be antagonist to *Rhizobium*.

In accordance with the present invention, the inoculant carrier is prepared from polymeric mixtures based on derivates of cellulose and a source of carbon, preferentially one or more amino acids or a carbohydrate selected from the following: starch, modified starch, such as carboxymethyl starch, carboxyethyl starch, carboxypropyl starch; mannitol; glucose; dextrine; polydextrine; malt-dextrine or mixtures thereof; with or without compatibility agents.

The water soluble polymer derived from cellulose may be selected from the group consisting of carboxymethylcellulose or esters of the same or alkaline metal salts of these, hydroxypropyl cellulose, hydroxypropylmethyl cellulose, hydroxyethyl cellulose and mixtures thereof.

Furthermore, the carrier may contain other nutrients or growth factors such as sugars, amino-acids, proteins, salts and similar, or mixtures thereof. The carrier may also contain osmotic-regulator agents, buffer agents or pH correctors and other components.

This inoculation carrier is based on a mixture of two water soluble and biodegradable polymers. The characteristic of the resulting carrier is that of a non-oleaginous and non-aqueous polymer in gel form.

The mixture can be compatibilized by the use of a substance selected from the group of zinc compound, a magnesium compound, a titanium compound and calcium salts, for example calcium carbonate, and by the addition of modified polymers, e.g. modified cellulose, mercaptan acetic acid, dodecylthiol, maleic anhydride, polyhydroxybutyrates and modified starch.

Preferentially, the mixture is composed of carboxymethylcellulose (CMC) and starch, giving greater preference to the use of a CMC of medium viscosity and, preferentially, made compatible with use of zinc oxide or magnesium oxide, in the case of mixtures requiring compatibility.

Techniques for compatibility are intended to improve the physical and mechanical properties of polymeric mixtures without resorting to reticulation (cross-link) processes. The mixtures of the present invention form interpenetrating networks and secondary interactions capable to guarantee a good dimensional stability of the mixture which is an important condition for maintaining a minimum number of *rhizobium* cells present in the mixture and, consequently, ensuring the success of the inoculant.

It is important to point out the difference between the polymeric mixtures of the present invention in which interpenetrating networks are formed, and the known state-of-the-art polymeric matrixes which are at least partially reticulated and that, therefore, are not as easily biologically degraded. The formation of interpenetrating chains in the polymer carrier of the present invention facilitates bio-degradability and, consequently, reduces the environmental impact and facilitates the release of the cells into the environment.

The compatibility assessment of the mixture may be done by means of water absorption trials, water solubility and the use of spectroscopy techniques in the infra-red region and scanning electron microscopy in order to determine effects on the stability of the polymer formed.

The dimensional stability of these mixtures may be improved through the addition of zinc oxide in adequate quantities.

The autoclave process also helps promote greater interaction of the polymeric chains conferring increased dimensional stability to the mixture. In this context, compatibility is enhanced due to better balance of the phases, which improves the dispersion of the *rhizobia* in the mixture.

In summary, the inoculant of the present invention presents a series of advantages when compared to actual state-of-the-art inoculants, such as: (i) being in a gel form that maintains a water rate sufficient to ensure greater survival of the cells while at the same time is not so excessive as to hinder the pelleting process of the seeds; (ii) being biodegradable which reduces the environmental impact and facilitates the release of the *rhizobia* cells into the environment; (iii) having a source of carbon which can be used by the bacterial cells both during storage and, later, at the time of their release into the environment; and (iv) the simplicity of the initial component materials which facilitates the production of the polymer and, thus, apart from reducing production costs also contains a reduced quantity of water which reduces the weight and volume of the material, making the product easier to transport to the agricultural area where it is to be employed.

EXAMPLE 1

A. Preparation of the Controlled Biodegradable Polymeric Mixture

CMC and starch mixtures were prepared in the concentrations presented in Table 1 below.

TABLE 1

| CMC (gram) | Starch (gram) | Zinc (%) |
|---|---|---|
| 80 | 20 | 0.1; 1.5 and 2.5 |
| 60 | 40 | 0.1; 1.5 and 2.5 |
| 50 | 50 | 0.1; 1.5 and 2.5 |
| 40 | 60 | 0.1; 1.5 and 2.5 |
| 20 | 80 | 0.1; 1.5 and 2.5 |

The mixtures conform to a proportion of 1:15 (polymer:water). In mixtures made compatible with ZnO, the latter was first dissolved in water with the CMC/starch mixture being dissolved in water separately, following which the solution containing ZnO was added to the polymeric solution. After preparation of the mixture both materials were submitted to an autoclave process at a pressure of 1.3 Kgf/cm$^2$ and temperature of 121° C. for a period of three hours.

The polymeric mixture which is in gel form before the autoclave process retains this form afterwards but, however, gains in consistency. The autoclave is the classic method for sterilisation so as to ensure absence of microorganisms and fungi and thus provides conditions adequate to the survival of the target microorganism.

FIG. 1 shows the Inoculant carrier of the present invention based on a mixture of compatible CMC/starch six months after preparation. It is possible to note the formation of a stable gel into which the *rhizobium* solution will be introduced.

B. Preparation of the Microorganism

*Rhizobia* stock was cultivated in solid-form medium "79" in a manner as to ensure culture purity and, later in liquid-form medium "79" (FRED, E. B.; WAKSMAN, S. A. Yeast extract-mannitol agar for laboratory manual of general microbiology. New York, McGraw Hill, 1928. 145 p.). After growth, the cells were centrifuged (10000×g; 10 minutes), washed in sterile water, centrifuged again (10000×g; 10 minutes) and suspended in sterile water.

C. Preparation of the Polymeric Mixture with the Microorganism

The microorganism solution prepared in Part B above is added to the polymer mixture prepared in Part A, under constant agitation in a laminar flow chamber at room temperature.

D. Cell Count

The composition of polymeric mixture and microorganism prepared in Part C above was assessed for survival of the bacterial suspension for a period of one month at room temperature. Periodically, a sample was collected and submitted to serial dilution and inoculated to solid-form culture medium "79" in order to determine the number of viable cells of the product.

Results are shown on Table 2 below, which provides the assessment of the cell count after 30 days inoculation at room temperature.

TABLE 2

| CMC/starch mixtures | Zinc oxide ratio (%) | 1st day | 2nd day | 5th day | 8th day | 12th day | 17th day | 23rd day | 30th day |
|---|---|---|---|---|---|---|---|---|---|
| 20/80 | 0 | 9.93 | 10.42 | 10.12 | 8.74 | 8.45 | 671 | 6.10 | 5.33 |
| 20/80 | 1 | 9.51 | 9.45 | 9.78 | 7.97 | 8.66 | 6.95 | 6.21 | 5.84 |
| 20/80 | 1.5 | 9.93 | 9.58 | 7.29 | 7.37 | 8.57 | 6.11 | 5.03 | 7.16 |
| 20/80 | 2.5 | 9.34 | 9.51 | 8.53 | 6.45 | 7.15 | 5.70 | 5.60 | 5.98 |
| Mixtures | | | | | | | | | |
| 40/60 | 0 | 9.98 | 9.73 | 9.27 | 8.34 | 8.07 | 9.65 | 7.91 | 8.69 |
| 40/60 | 1 | 9.77 | 9.64 | 10.31 | 8.01 | 8.31 | 8.67 | 8.40 | 8.03 |
| 40/60 | 1.5 | 9.35 | 9.61 | 8.56 | 8.55 | 8.61 | 7.66 | 6.78 | 6.92 |
| 40/60 | 2.5 | 9.54 | 9.38 | 8.11 | 7.26 | 6.07 | 6.23 | 7.40 | 5.08 |
| 50/50 | 0 | 9.65 | 9.78 | 10.39 | 9.39 | 9.60 | 9.53 | 9.00 | 8.92 |
| 50/50 | 1 | 9.56 | 9.62 | 9.31 | 8.41 | 9.52 | 8.78 | 8.58 | 6.99 |
| 50/50 | 1.5 | 9.92 | 8.87 | 8.80 | 7.98 | 8.53 | 7.72 | 7.64 | 4.88 |
| 50/50 | 2.5 | 9.44 | 9.39 | 8.12 | 8.53 | 6.80 | 6.20 | 6.04 | 5.82 |
| 60/40 | 0 | 10.13 | 8.68 | 9.45 | 10.18 | 7.78 | 8.08 | 9.09 | 8.98 |
| 60/40 | 1 | 9.51 | 10.59 | 8.64 | 8.73 | 7.36 | 8.62 | 7.30 | 8.30 |
| 60/40 | 1.5 | 9.53 | 9.48 | 7.77 | 7.12 | 6.06 | 6.09 | 7.16 | 7.54 |
| 60/40 | 2.5 | 9.65 | 9.18 | 9.36 | 7.37 | 5.26 | 5.74 | 6.03 | 5.65 |
| 80/20 | 0 | 9.54 | 9.12 | 9.49 | 9.67 | 9.02 | 7.56 | 9.07 | 8.27 |
| 80/20 | 1 | 9.23 | 8.81 | 8.69 | 9.57 | 9.65 | 7.67 | 8.75 | 7.72 |
| 80/20 | 1.5 | 9.62 | 8.45 | 7.85 | 8.26 | 7.74 | 6.04 | 7.85 | 6.61 |
| 80/20 | 2.5 | 9.42 | 9.80 | 7.23 | 7.24 | 6.65 | 7.03 | 8.37 | 6.65 |

It can be seen that after 30 days the total number of cells is superior for CMC concentrations above 50% in all samples not having been made compatible.

The mixtures containing ZnO demonstrate better dimensional stability. However, the *rhizobium* cell density values are lower.

The resulting values for the use of ZnO in a concentration of 1% are satisfactory for the application of the product.

What is claimed is:

1. A polymeric composition containing *rhizobium* and *Herbaspirillum* spp inoculants comprising:
   (a) an aqueous suspension containing cells of microorganisms of the genus *rhizobium* and *Herbaspirillum* spp;
   (b) a vehicle, in gel form, comprising a mixture of carboxymethylcellulose and starch, wherein the concentration of carboxymethylcellulose in the carboxymethylcellulose/starch mixture is above 50%;
   (c) water in sufficient quantity to form the polymeric composition and maintain the viability of the cells of microorganisms of the genus *rhizobium* and the viability of the *Herbaspirillum* spp with the proviso that said cells of microorganisms of the genus *rhizobium* and said *Herbaspirillum* spp are not antagonistic to each other.

2. The composition of claim 1 wherein the suspension containing cells of microorganisms of the genus *rhizobium* and *Herbaspirillurn* spp is first sterilized.

3. The composition of claim 1 wherein the vehicle, in gel form, is first sterilized.

4. The composition of claim 1 further comprising a mixture compatibility agent comprising 1% zinc oxide.

5. The composition of claim 1 further comprising nutrient additives or growth factors selected from the group consisting from sugars, amino-acids, proteins, salts and mixtures thereof.

6. The composition of claim 1 further comprising adjuvants selected from osmotic-regulator agents, buffer agents, and pH correctors.

7. A method of treating seeds to propagate *rhizobium* and *Herbaspirillum* spp wherein the composition of claim 1 is applied to seeds to be planted.

8. A method of facilitating symbiosis of *rhizobia* cells and roots wherein the composition of claim 1 is applied to soil surrounding plant roots.

9. Seeds of leguminous or non-leguminous plants wherein said seeds are treated with the composition of claim 1.

10. A polymeric composition containing an inoculant of *Herbaspirillum* spp comprising:
    (a) an aqueous suspension containing cells of *Herbaspirillum* spp;
    (b) a vehicle, in gel form, comprising a mixture of carboxymethylcellulose and starch, wherein the concentration of carboxymethylcellulose in the carboxymethylcellulose/starch mixture is above 50%;
    (c) water in sufficient quantity to form the polymeric composition and maintain the viability of the cells of *Herbaspirillum* spp.

11. The composition of claim 10 wherein the suspension containing cells of *Herbaspirillum* spp is first sterilized.

12. The composition of claim 10 wherein the vehicle, in gel form, is first sterilized.

13. The composition of claim 10 further comprising a mixture compatibility agent comprising 1% zinc oxide.

14. The composition of claim 10 further comprising nutrient additives or growth factors selected from the group consisting from sugars, amino-acids, proteins, salts and mixtures thereof.

15. The composition of claim 10 further comprising adjuvants selected from osmotic-regulator agents, buffer agents, and pH correctors.

16. A method of treating seeds to propagate *rhizobium* and *Herbaspirillum* spp wherein the composition of claim 10 is applied to seeds to be planted.

17. A method of facilitating symbiosis of *rhizobia* cells and roots wherein the composition of claim 10 is applied to soil surrounding plant roots.

18. Seeds of leguminous or non-leguminous plants wherein said seeds are treated with the composition of claim 10.

* * * * *